(12) United States Patent
Lee et al.

(10) Patent No.: US 9,386,651 B2
(45) Date of Patent: Jul. 5, 2016

(54) BACKLIGHT UNIT AND A DISPLAY DEVICE HAVING THE SAME

(71) Applicant: SAMSUNG DISPLAY CO., LTD., Yongin, Gyeongggi-do (KR)

(72) Inventors: Sanghyun Lee, Incheon (KR); Seonhye Kim, Yongin-si (KR); Jeong Bong Lee, Busan (KR); MiKyung Kang, Ulsan (KR); Kyung-Uk Choi, Gunpo-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/263,124

(22) Filed: Apr. 28, 2014

(65) Prior Publication Data

US 2015/0130371 A1    May 14, 2015

(30) Foreign Application Priority Data

Nov. 12, 2013    (KR) .................. 10-2013-0136915

(51) Int. Cl.
| | | |
|---|---|---|
| *H05B 33/08* | (2006.01) | |
| *G09G 3/34* | (2006.01) | |
| *G09G 3/36* | (2006.01) | |

(52) U.S. Cl.
CPC ............ *H05B 33/0851* (2013.01); *G09G 3/342* (2013.01); *H05B 33/0815* (2013.01); *H05B33/0827* (2013.01); *G09G 3/3648* (2013.01); *G09G 2320/064* (2013.01); *G09G 2320/0646* (2013.01); *Y02B 20/346* (2013.01)

(58) Field of Classification Search
CPC .............. G09G 3/3406; G09G 3/3696; H05B 33/0848; H05B 33/0827; H05B 33/0815; H03M 1/822

USPC .......... 345/690, 102; 315/294, 185 R, 209 R, 315/291, 307, 308, 122, 224, 185 S, 312; 341/152
See application file for complete search history.

(56) References Cited

U.S. PATENT DOCUMENTS

| | | | | |
|---|---|---|---|---|
| 2005/0093730 A1* | 5/2005 | Mourrier | ............... | H03M 1/822 341/152 |
| 2010/0295876 A1* | 11/2010 | Shin | ..................... | G09G 3/3406 345/690 |

(Continued)

FOREIGN PATENT DOCUMENTS

| | | |
|---|---|---|
| JP | 2012-150887 | 8/2012 |
| JP | 2013-110918 | 6/2013 |

(Continued)

OTHER PUBLICATIONS

J. Garcia, et al., "Low Ripple Interleaved Converter for Fast PWM Dimming of Power LEDs", 2010 IEEE, pp. 915-920.

(Continued)

*Primary Examiner* — Alexander H Taningco
*Assistant Examiner* — Renan Luque
(74) *Attorney, Agent, or Firm* — F. Chau & Associates, LLC (57) ABSTRACT

A backlight unit includes a dimming signal generator configured to generate first and second pulse width modulation signals, first and second driving blocks configured to receive a driving voltage to emit a light, a controller configured to receive the first and second pulse width modulation signals and an output signal from one of the first and second driving blocks to generate a voltage control signal, and a voltage converter configured to control a level of an input voltage in response to the voltage control signal to generate the driving voltage.

13 Claims, 8 Drawing Sheets

(56) References Cited

U.S. PATENT DOCUMENTS

| | | | |
|---|---|---|---|
| 2011/0248648 A1* | 10/2011 | Liu | G09G 3/3406 315/294 |
| 2012/0127210 A1* | 5/2012 | Huang | H05B 33/0815 345/690 |
| 2013/0057165 A1* | 3/2013 | Ide | H05B 33/0845 315/186 |

FOREIGN PATENT DOCUMENTS

| | | |
|---|---|---|
| KR | 1020070025176 | 3/2007 |
| KR | 1020070062016 | 6/2007 |
| KR | 1020080048729 | 6/2008 |
| KR | 1020080070214 | 7/2008 |
| KR | 1020100012284 | 2/2010 |
| KR | 1020100118380 | 11/2010 |
| KR | 1020110038335 | 4/2011 |
| KR | 1020130016897 | 2/2013 |

OTHER PUBLICATIONS

S.K. Lim et al., "Technology Trends of Visible Light Communication Coupled with LED Illumination", ETRI Apr. 25, 2010, pp. 38-47 (Abstract in English).

* cited by examiner

BACKLIGHT UNIT AND A DISPLAY DEVICE HAVING THE SAME

CROSS-REFERENCE TO RELATED APPLICATION

This U.S. non-provisional patent application claims priority under 35 U.S.C. §119 to Korean Patent Application No. 10-2013-0136915, filed on Nov. 12, 2013, the disclosure of which is incorporated by reference herein in its entirety.

TECHNICAL FIELD

The present invention relates to a backlight unit and a display device having the same. More particularly, the present invention relates to a backlight unit capable of emitting a light using a dimming method and a display device having the backlight unit.

DISCUSSION OF THE RELATED ART

A display device such as a liquid crystal display includes a display panel to display an image and gate and data drivers to drive the display panel. The display panel includes gate lines, data lines, and pixels connected to the gate lines and the data lines. The gate lines receive gate signals from the gate driver and the data lines receive data voltages from the data driver. The pixels receive the data voltages through the data lines in response to the gate signals provided through the gate lines. The pixels display gray scales corresponding to the data voltages, and thus desired images are displayed.

The display device includes a backlight unit disposed under the display panel to supply light to the display panel. This is so, because the display device is not self-emissive. The backlight unit may emit the light in accordance with a dimming method. For example, driving blocks of the backlight unit individually emit the light in accordance with the gray scales of the images displayed in the display panel.

SUMMARY

An exemplary embodiment of the present invention provides a backlight unit capable of emitting a light using a dimming method.

An exemplary embodiment of the present invention provides a display device having the backlight unit.

An exemplary embodiment of the present invention provides a backlight unit including a dimming signal generator configured to generate first and second pulse width modulation signals, first and second driving blocks configured to receive a driving voltage to emit a light, a controller configured to receive the first and second pulse width modulation signals and an output signal from one of the first and second driving blocks to generate a voltage control signal, and a voltage converter configured to control a level of an input voltage in response to the voltage control signal to generate the driving voltage.

The first acid second pulse width modulation signals have different frequencies from each other.

The voltage converter is a DC-DC converter.

The controller includes: a first logic circuit configured to perform a logical OR-operation of the first and second pulse width modulation signals to output a logic value; a comparator configured to compare the output signal from the one of the first and second driving blocks with a reference signal; a pulse generator configured to generate a driving pulse signal in accordance with the compared result of the comparator; and a second logic circuit configured to perform a logical AND-operation on the logic value and the driving pulse signal to output the voltage control signal.

The first logic circuit comprises an OR gate.

The second logic circuit comprises an AND gate.

The second pulse width modulation signal has a frequency higher than a frequency of the first pulse width modulation signal.

A total duty ratio of the first pulse width modulation signal is equal to a total duty ratio of the second pulse width modulation signal.

The first driving block is configured to receive the driving voltage and is operated in response to the first pulse width modulation signal; and the second driving block is configured to receive the driving voltage and is operated in response to the second pulse width modulation signal.

The first driving block includes: a plurality of first light emitting diodes connected to each other in series to receive the driving voltage; and a first driving transistor connected between a ground terminal and the first light emitting diodes, the second driving block includes: a plurality of second light emitting diodes connected to each other in series to receive the driving voltage; and a second driving transistor connected between the ground terminal and the second light emitting diodes, the first driving transistor is switched in response to the first pulse width modulation signal, and the second driving transistor is switched in response to the second pulse width modulation signal.

An output signal output from the first driving transistor is applied to the controller. The first driving block includes: a plurality of light emitting diodes connected to each other in series to receive the driving voltage; and as driving transistor connected between a ground terminal and the light emitting diodes, and the driving transistor is switched in response to the first pulse width modulation signal.

An exemplary embodiment of the present invention provides a display device including a display panel that includes a plurality of pixels configured to display an image and a backlight unit configured to supply a light to the display panel. The backlight unit includes a dimming signal generator configured to generate first and second pulse width modulation signals, first and second driving blocks configured to receive a driving voltage to emit a light, a controller configured to receive the first and second pulse width modulation signals and an output signal from one of the first and second driving blocks to generate a voltage control signal, and a voltage converter configured to control a level of an input voltage in response to the voltage control signal to generate the driving voltage. The first pulse width modulation signal has a frequency higher than a frequency of the second pulse width modulation signal, and a total duty ratio of the first pulse width modulation signal is equal to a total duty ratio of the second pulse width modulation signal.

The controller includes: a first logic circuit configured to perform a logical operation on the first and second pulse width modulation signals to output a logic value; a comparator configured to compare the output signal from the one of the first and second driving blocks with a reference signal; a pulse generator configured to generate a driving pulse signal according to the compared result from the comparator; and a second logic circuit configured to perform a logical operation on the logic value and the driving pulse signal to output the voltage control signal.

The first driving block is configured to receive the driving voltage and is operated in response to the first pulse width modulation signal; and the second driving block is configured to receive the driving voltage and is operated in response to the second pulse width modulation signal.

The first driving block includes: a plurality of first light emitting diodes connected to each other in series to receive the driving voltage; and a first driving transistor connected between a ground terminal and the first light emitting diodes, the second driving block includes: a plurality of second light emitting diodes connected to each other in series to receive the driving voltage; and a second driving transistor connected between the ground terminal and the second light emitting diodes, and an output signal from the first driving transistor is applied to the controller.

An exemplary embodiment of the present invention provides a backlight unit including: a signal generator configured to generate first and second pulse width modulation signals; and a light source including a first driving block and a second driving block each receiving a driving voltage, wherein the first driving block is configured to emit light in first and second consecutive periods in response to the first pulse width modulation signal and the second driving block is configured to emit light in the first period in response to the second pulse width modulation signal and not emit light in the second period in response to the second pulse width modulation signal.

The backlight unit further including a controller configured to receive the first and second pulse width modulation signals and an output of one of the first and second driving blocks to generate a voltage control signal.

The backlight unit further including a voltage converter configured to generate the driving voltage in response to the voltage control signal.

BRIEF DESCRIPTION OF THE DRAWINGS

The above and other features of the present invention will become more apparent by describing in detail exemplary embodiments thereof with reference to the accompanying drawings wherein.

DETAILED DESCRIPTION OF EXEMPLARY EMBODIMENTS

Exemplary embodiments of the present invention will be described more fully hereinafter with reference to the accompanying drawings. The present invention may, however, be embodied in many different forms and should not be construed as limited to the embodiments set forth herein.

It will be understood that when an element or layer is referred to as being "on", "connected to" or "coupled to" another element or layer, it can be directly on, connected or coupled to the other element or layer or intervening elements or layers may be present. Like numbers may refer to like elements throughout the specification and drawings.

Figure 1:
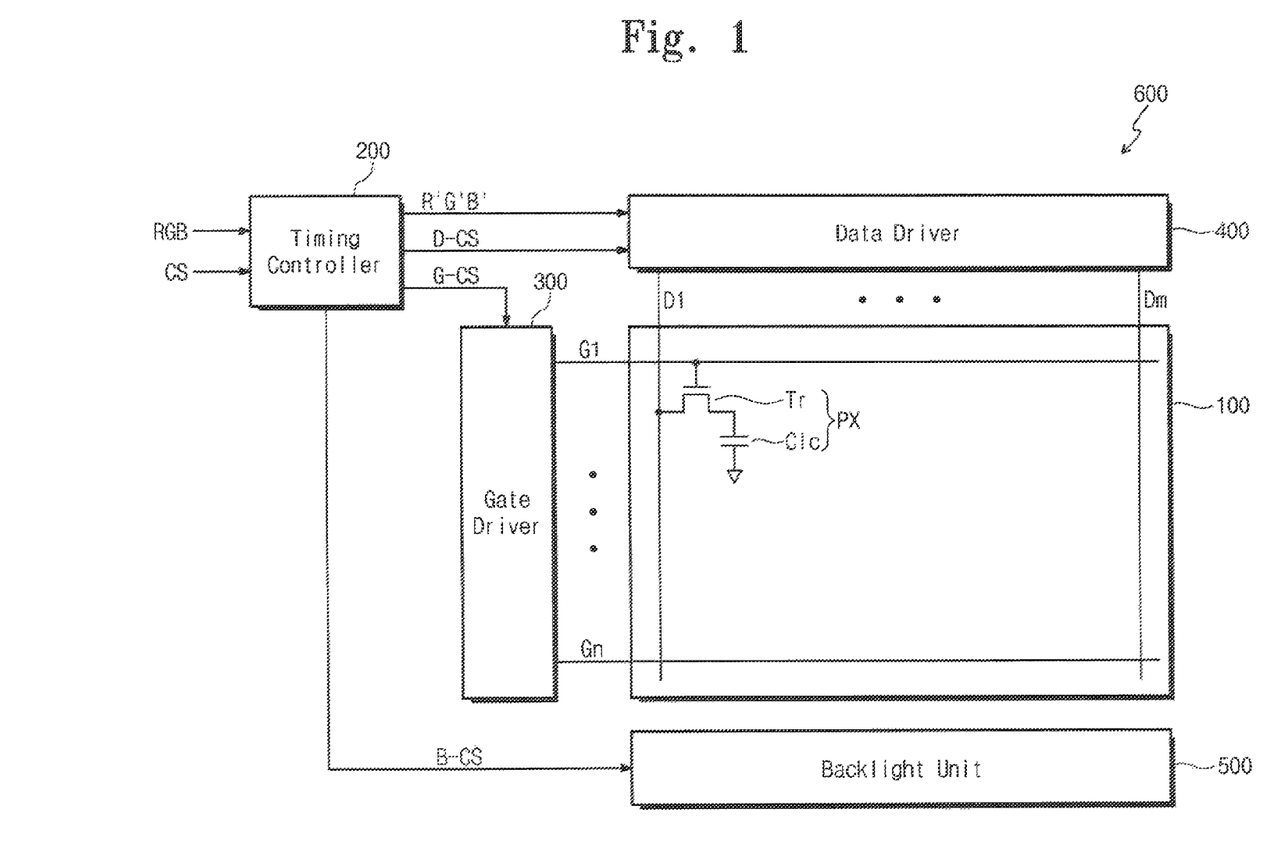
FIG. 1 is a block diagram showing a display device according to an exemplary embodiment of the present invention.

As used herein, the singular forms, "a", "an" and "the" are intended to include the plural forms as well, unless the context clearly indicates otherwise. FIG. 1 is a block diagram showing a display device 600 according to an exemplary embodiment of the present invention.

Referring to FIG. 1, the display device 600 includes a display panel 100, a timing controller 200, a gate driver 300, a data driver 400, and a backlight unit 500.

The display panel 100 includes a plurality of gate lines G1 to Gn, a plurality of data lines D1 to Dm, and a plurality of pixels PX. The gate lines G1 to Gn extend in a row direction to cross the data lines D1 to Dm extending in a column direction.

Each pixel PX is connected to a corresponding gate line of the gate lines G1 to Gn and a corresponding data line of the data lines D1 to Dm. As an example, FIG. 1 shows one pixel PX connected to a first gate line G1 and a first data line D1. The pixel PX connected to the first gate line G1 and the first data line D1 includes a thin film transistor Tr and a liquid crystal capacitor C1c. The thin film transistor Tr includes a gate electrode connected to the first gate line G1, a source electrode connected to the first data line D1, and a drain electrode connected to the liquid crystal capacitor C1c. Although not shown in FIG. 1, other pixels may have the same structure and function as the pixel PX.

The timing controller 200 receives image signals RGB and control signals CS from the outside of the display device 600. The timing controller 200 converts a data format of the image signals RGB to a data format appropriate to interface between the data driver 400 and the timing controller 200. The converted image signals R'G'B' are applied to the data driver 400.

The timing controller 200 generates a gate control signal G-CS, a data control signal D-CS, and a backlight control signal B-CS in response to the control signals CS.

The gate driver 300 sequentially outputs gate signals in response to the gate control signal G-CS from the timing controller 200. The pixels PX are sequentially scanned by the gate signals in the unit of a row.

The data driver 400 converts the image signals R'G'B' to data voltages in response to the data control signal D-CS from the timing controller 400 and applies the data voltages to the display panel 100.

The pixels PX receive the data voltages in response to the gate signals. The pixels PX display gray scales corresponding to the data voltages, and thus desired images are displayed.

The backlight unit 500 is disposed at a rear side of the display panel 100 and includes a plurality of driving blocks. In the present exemplary embodiment, the backlight unit 500 may individually emit light through the driving blocks in response to the backlight control signal B-CS from the timing controller 200. Here, the backlight unit 500 may be driven by a dimming method that individually controls the driving blocks.

Figure 2:
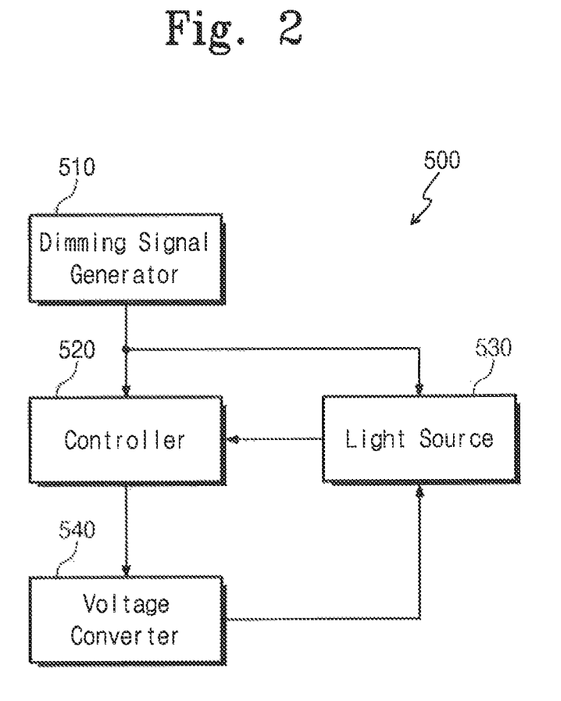
FIG. 2 is a block diagram showing a backlight unit shown in FIG. 1, according to an exemplary embodiment of the present invention.

FIG. 2 is a block diagram showing the backlight unit 500 shown in FIG. 1, according to an exemplary embodiment of the present invention.

Referring to FIG. 2, the backlight unit 500 includes a dimming signal generator 510, a controller 520, a light source 530, and a voltage converter 540. In the present exemplary embodiment, the backlight unit 500 will be explained as being operated based on the backlight control signal BCS from the timing controller 200.

The dimming signal generator 510 generates pulse width modulation signals corresponding to the driving blocks. The pulse width modulation signals are set to have different frequencies. The pulse width modulation signals generated by the dimming signal generator 510 are applied to the controller 520 and the light source 530.

The controller 520 receives the pulse width modulation signals from the dimming signal generator 510 and an output voltage from the light source 530. The controller 520 generates a voltage control signal PWMS in response to the pulse width modulation signals and the output voltage to control the operation of the voltage converter 540. A driving voltage output from the voltage convertor 540 has a level controlled by the voltage control signal PWMS.

The light source 530 includes the driving blocks. Each driving block supplies the light to the display panel 100 in response to the pulse width modulation signal from the dimming signal generator 510 and the driving voltage from the voltage converter 540. In addition, the light source 530 applies an output voltage from one of the driving blocks to the controller 520.

The voltage converter 540 converts an external input voltage to the driving voltage required to drive the light source 530 in response to the voltage control signal PWMS from the controller 520. In other words, the voltage converter 540 may control the level of the external input voltage to generate the driving voltage used to drive the light source 530. The voltage converter 540 applies the generated driving voltage to the light source 530.

In addition, when the voltage control signal PWMS at a low level is output from the controller 520, the voltage converter 540 is turned off, and thus the driving voltage is not generated in the voltage converter 540. As a result, the light source 530 does not emit the light. When the voltage control signal PWMS at a high level is output from the controller 520, the voltage converter 540 is turned on, and thus the driving voltage is generated by the voltage converter 540. As a result, the light source 530 emits the light.

Figure 3:
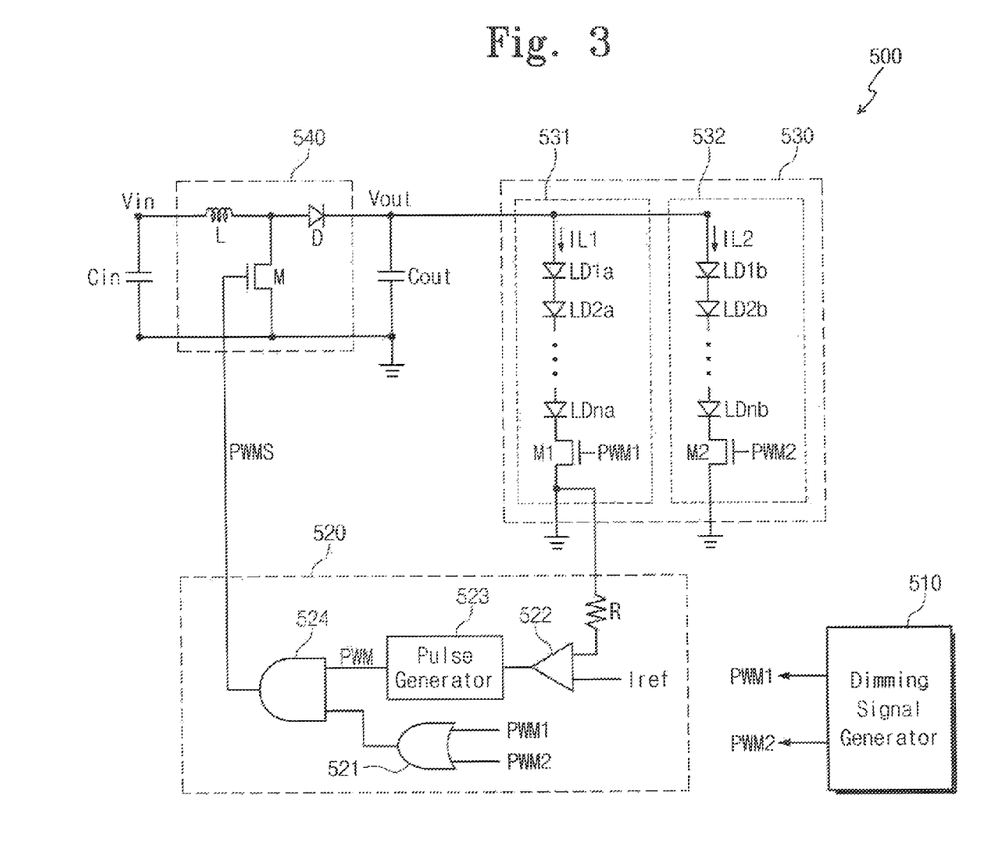
FIG. 3 is a circuit diagram showing the backlight unit shown in FIG. 2, according to an exemplary embodiment of the present invention.

FIG. 3 is a circuit diagram showing the backlight unit shown in FIG. 2, according to an exemplary embodiment of the present invention.

Referring to FIG. 3, the dimming signal generator 510 generates first and second pulse width modulation signals PWM1 and PWM2. The dimming signal generator 510 applies the first and second pulse width modulation signals PWM1 and PWM2 to the light source 530 and the controller 520.

The controller 520 includes a first logic circuit 521, a comparator 522, a pulse generator 523, a second logic circuit 524, and a resistor R.

The first logic circuit 521 receives the first and second pulse width modulation signals PWM1 and PWM2 from the dimming signal generator 510. The first logic circuit 521 performs a logical operation on the first and second pulse width modulation signals PWM1 and PWM2 and outputs the calculated logic value. In the present exemplary embodiment, the first logic circuit 521 performs a logical OR-operation on the first and second pulse width modulation signals PWM1 and PWM2. In other words, the first logic circuit 521 is realized by an OR gate.

The comparator 522 receives an output signal of a first driving transistor M1 through the resistor R. The comparator 522 compares the output signal provided through the resistor R with a reference signal Iref and outputs the compared result as a comparison signal. For example, when the output signal of the first driving transistor M1 is lower than the reference signal Iref, the comparator 522 applies a first comparison signal to the pulse generator 523 to increase the driving voltage. On the contrary, when the output signal of the first driving transistor M1 is higher than the reference signal Iref, the comparator 522 applies a second comparison signal to the pulse generator 523 to decrease the driving voltage.

In addition, as shown in FIG. 3, the comparator 522 receives only an output signal of a first driving block 531 and compares the output signal of the first driving block 531 with the reference signal Iref. For example, each driving block includes diodes and transistors, which have the same size, and is applied with the same driving voltage. In this case, since the output signal of each driving block is constant, the output signal of any one of the driving blocks can be applied to the comparator 522.

The pulse generator 523 generates a driving pulse signal PWM in response to the comparison signal output from the comparator 522.

The second logic circuit 524 receives the logic value from the first logic circuit 521 and the driving pulse signal PWM from the pulse generator 523. The second logic circuit 524 generates the voltage control signal PWMS by performing a logical calculation on the logic value and the driving pulse signal PWM and applies the voltage control signal PWMS to the voltage converter 540. In the present exemplary embodiment, the second logic circuit 524 is realized by an AND gate.

As described above, the controller 520 may generate the voltage control signal PWMS in response to the first and second pulse width modulation signals PWM1 and PWM2 and the output voltage from the light source 530 to control the voltage converter 540.

The light source 530 includes first and second driving blocks 531 and 532. The light source 530 emits the light to the display panel 100 (refer to FIG. 1) in response to the driving voltage Vout output from the voltage converter 540.

For example, the first driving block 531 includes a plurality of first light emitting diodes LD1$a$ to LDna and the first driving transistor M1. The first light emitting diodes LD1$a$ to LDna are connected between a driving voltage terminal and the first driving transistor M1 in series. The first driving transistor M1 is connected between a ground terminal and the first light emitting diodes LD1$a$ to LDna. The first driving transistor M1 is applied with the first pulse width modulation signal PWM1 through a gate terminal thereof.

The first driving transistor M1 is driven in response to the first pulse width modulation signal PWM1 generated by the dimming signal generator 510. For instance, when the first pulse width modulation signal PWM1 at the high level is applied to the gate terminal of the first driving transistor M1, the first driving transistor M1 is turned on. Due to the turned-on first driving transistor M1, the first light emitting diodes LD1$a$ to LDna are driven. Therefore, the first driving block 531 emits the light to the display panel 100.

The second driving block 532 includes a plurality of second light emitting diodes LD1$b$ to LDnb and a second driving transistor M2. The second light emitting diodes LD1$b$ to LDnb are connected between the driving voltage terminal and the second driving transistor M2 in series. The second driving transistor M2 is connected between the ground terminal and the second light emitting diodes LD1$b$ to LDnb. The second driving transistor M2 is applied with the second pulse width modulation signal PWM2 through a gate terminal thereof.

The second driving transistor M2 is driven in response to the second pulse width modulation signal PWM2 generated by the dimming signal generator 510. For instance, when the second pulse width modulation signal PWM2 at the high level is applied to the gate terminal of the second driving transistor M2, the second driving transistor M2 is turned on. Due to the turned-on second driving transistor M2, the second light emitting diodes LD1b to LDnh are driven. Thus, the second driving block 532 emits the light to the display panel 100.

As described above, the first and second driving blocks 531 and 532 are substantially simultaneously or individually operated in accordance with the first and second pulse width modulation signals PWM1 and PWM2.

The voltage converter 540 includes an input capacitor Cin, a transistor M, a diode D, an inductor L, and an output capacitor Cout. In the present exemplary embodiment, the voltage converter 540 may be a DC-DC converter to control a level of the external input voltage Vin. As an example, the voltage converter 540 may be, but not limited to, a boost type. In other words, when the level of the driving voltage required to drive the light source 530 is higher than the level of the external input voltage Vin, the voltage converter 540 performs an operation to increase the level of the external input voltage Vin.

For example, an end of the inductor L is connected to an input terminal of the voltage converter 540 and the other end of the inductor L is connected to a drain terminal of the transistor M. The diode D is connected between the drain terminal of the transistor M and an output terminal of the voltage converter 540. The drain terminal of the transistor M is connected between the inductor L and the diode D, a source terminal of the transistor M is connected to the ground terminal, and a gate terminal of the transistor M is connected to the second logic circuit 524 to receive the voltage control signal PWMS.

When the voltage control signal PWMS at the high level is applied to the gate terminal of the transistor M, the transistor M is turned on. In this case, a driving current corresponding to the input voltage Vin is applied to the inductor L. The diode D prevents electric charges in the output capacitor Cout from being applied to the transistor M. In addition, when the voltage control signal PWMS at the low level is applied to the gate terminal of the transistor M, the transistor M is turned off. In this case, a voltage obtained by summing the voltage of the inductor L and the input voltage Vin is transferred to the output terminal of the voltage converter 540 through the diode D, and thus the level of the input voltage Vin is increased.

As described above, the voltage converter 540 may control the level of the input voltage Vin in response to the voltage control signal PWMS provided from the controller 520. In addition, the voltage converter 540 used to increase the level of the input voltage Vin is not limited to the boost type.

In general, a dimming signal generator generates one pulse width modulation signal. When the pulse width modulation signal generated by the dimming signal generator is transited from the high level to the low level, a voltage control signal PMWS with the low level is generated. Accordingly, a voltage converter is not driven and the level of a driving voltage is decreased.

When the pulse width modulation signal is transited from the low level to the high level, the voltage control signal PWMS having the high level, which corresponds to a driving pulse signal of a pulse generator, is generated. Therefore, the voltage converter is driven and the level of the driving voltage is increased. As the number of periods in which the pulse width modulation signal is transited increases, the level of the driving voltage is repeatedly changed. As a result, vibrations are generated in an output capacitor due to the voltage control signal PWMS.

In addition, as the low level period of the pulse width modulation signal becomes longer, the level of the driving voltage is decreased. Thus, a ripple is generated at a time point, in which the pulse width modulation signal is transited from the low level to the high level, since the variation in the level of the driving voltage is intensified.

As a result, the driving voltage applied to a light source may not be synchronized with a gate signal of a display panel. Consequently, a phase at the turn-off of the gate signal becomes different from a phase of the driving voltage and a waterfall noise is caused by a brightness difference between images.

However, since the dimming signal generator 510 according to the present exemplary embodiment generates the first and second pulse width modulation signals PWM1 and PWM2, the low level period of the pulse width modulation signal may be shortened. For example, the first and second pulse width modulation signals PWM1 and PWM2 have different frequencies. For instance, when the second pulse width modulation signal PWM2 has a frequency two times as large as the frequency of the first pulse width modulation signal PWM1, a duty ratio of the second pulse width modulation signal PWM2 becomes two times smaller than that of the first pulse width modulation signal PWM1.

Accordingly, the period in which both of the first and second pulse width modulation signals PWM1 and PWM2 are at the low level may be shorter than the period in which one pulse width modulation signal is at the low level. In other words, when any one of the first and second pulse width modulation signals PWM1 and PWM2 is at the high level, the voltage converter 540 may be continuously driven, thereby preventing the driving voltage Vout from being lowered. This will be described in detail with reference to FIG. 8.

As described above, since the dimming signal generator 510 generates the first and second pulse width modulation signals PWM1 and PWM2 having different frequencies from each other, the period in which the level of the driving voltage Vout is lowered may be shortened. Thus, a waterfall noise may be prevented from occurring and a ripple generated when the pulse width modulation signal is transited from the low level to the high level may be prevented.

Figure 4:
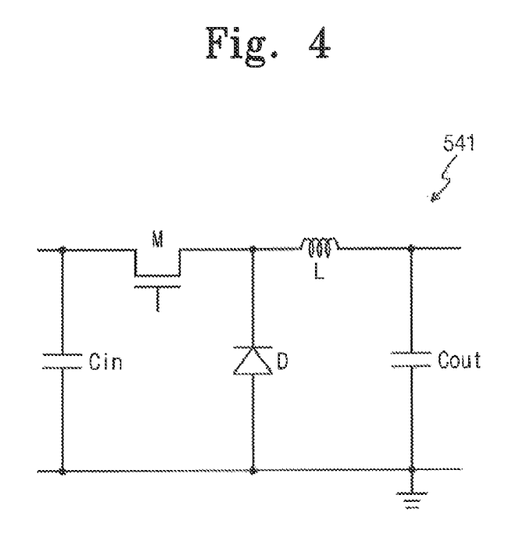
FIGS. 4 to 6 are circuit diagrams each showing a voltage converter shown in FIG. 3, according to an exemplary embodiment of the present invention.
Figure 5:
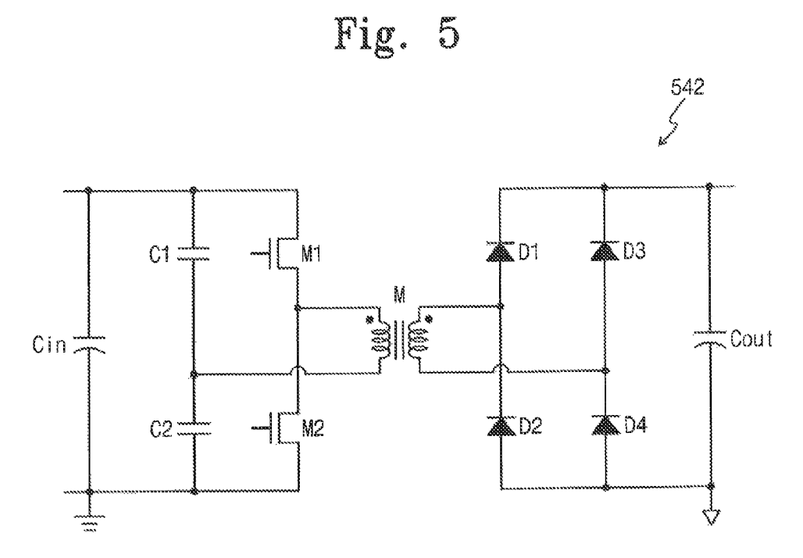
Figure 6:
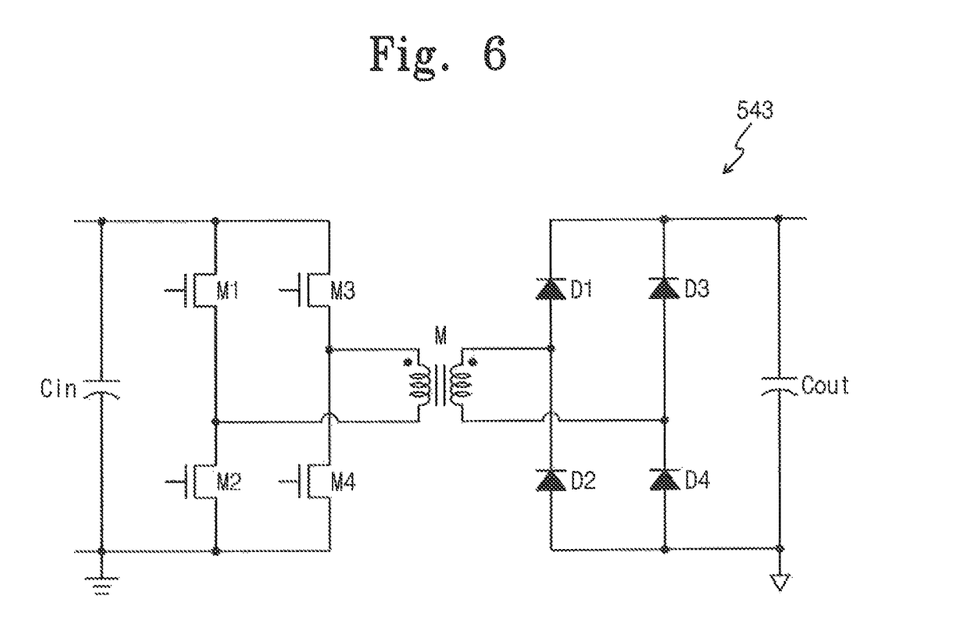

FIGS. 4 to 6 are circuit diagrams each showing the voltage converter shown in FIG. 3, according to an exemplary embodiment of the present invention.

Referring to FIG. 4, a voltage converter 541 may be, but not limited to, a buck type converter. For example, the voltage converter 541 of the buck type performs an operation to decrease the driving voltage Vout level when the level of the driving voltage Vout required to drive the light source 530 is lower than the level of the input voltage Vin applied to the voltage converter 541. The voltage converter 541 includes an input capacitor Gin, a transistor M, a diode D, an inductor L, and an output capacitor Cout. In addition, voltage converters 542 and 543 may be realized by a half-bridge type converter and a full-bridge type converter, respectively, as shown in FIGS. 5 and 6. The voltage converter 542 includes an input capacitor Cin, first and second capacitors C1 and C2, first and second transistors M1 and M2, mutually coupled inductors M, first to fourth diodes D1-D4 and an output capacitor Gout. The voltage converter 543 includes an input capacitor Cin, first to fourth transistors M1-M4, mutually coupled inductors M, first to fourth diodes D1-D4 and an output capacitor Cout. As described above, various voltage converters may be used to adjust the level of the driving voltage Vout for the light source 530.

Figure 7:
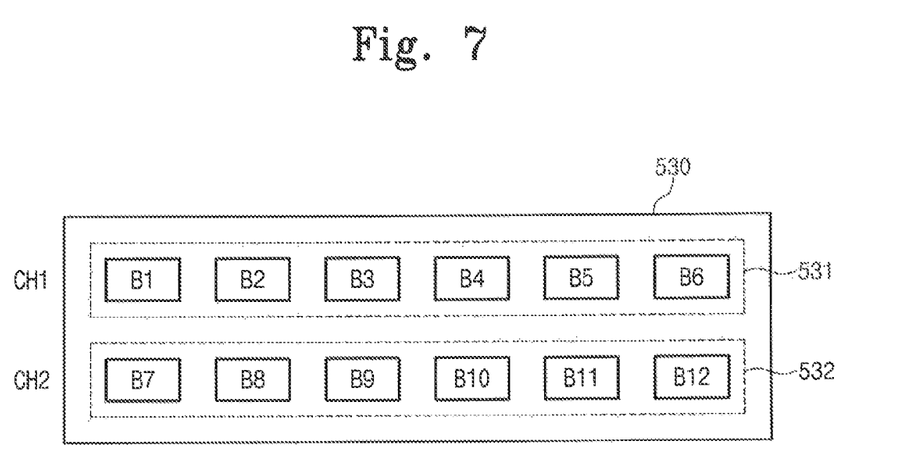
FIG. 7 is a view showing a light source shown in FIG. 3 in the unit of block, according to an exemplary embodiment of the present invention.

FIG. 7 is a view showing the light source 530 shown in FIG. 3 in the unit of a block, according to an exemplary embodiment of the present invention.

Referring to FIG. 7, the light source 530 includes first and second channels CH1 and CH2 each including diodes. The first channel CH1 includes first diodes B1 to B6 of the first driving block 531, which are connected to each other in series. The second channel CH2 includes second diodes B7 to B12 of the second driving block 532, which are connected to each other in series. The first and second driving blocks 531 and 532 are disposed substantially in parallel to each other in the light source 530.

Figure 8:
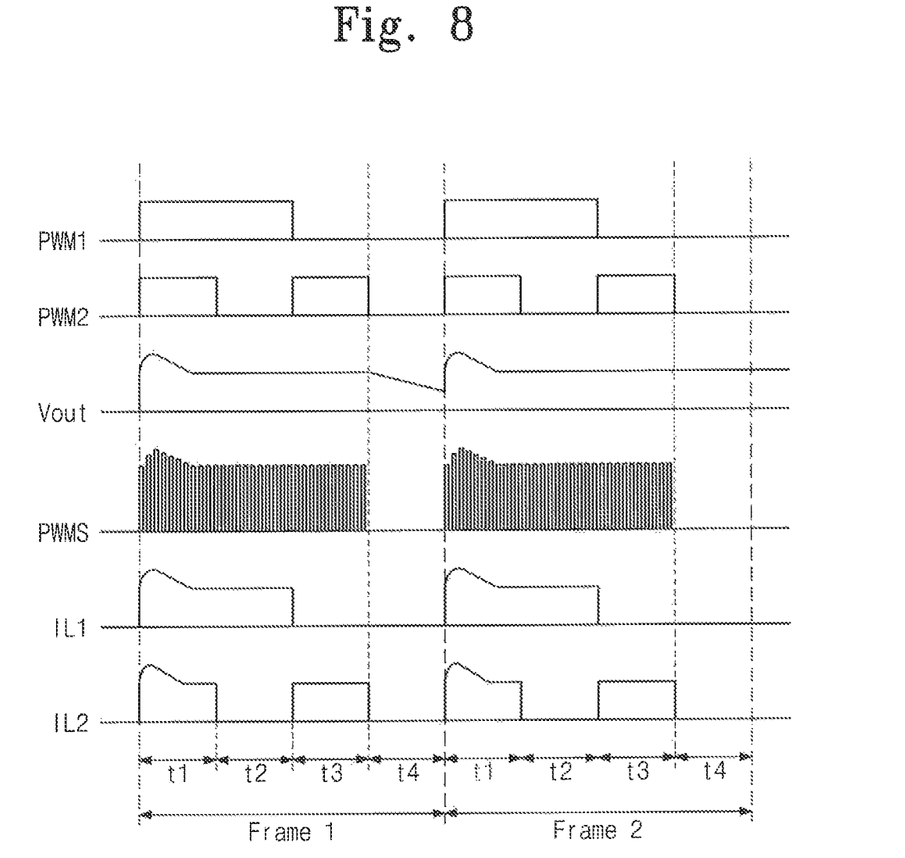
FIG. 8 is a timing diagram showing an operation of the backlight unit shown in FIG. 3, according to an exemplary embodiment of the present invention.

FIG. 8 is a timing diagram showing an operation of the backlight unit shown in FIG. 3, according to an exemplary embodiment of the present invention.

Referring to FIGS. 3 and 8, the backlight unit 500 may be repeatedly driven for each frame configured to include first to fourth time periods t1 to t4.

In the present exemplary embodiment, the frequency of the second pulse width modulation signal PWM2 may be set to be two times larger than the frequency of the first pulse width modulation signal PWM1. For instance, when the frequency of the first pulse width modulation signal PWM1 is set to about 1 KHz, the frequency of the second pulse width modulation signal PWM2 is set to about 2 KHz. As a result, the duty ratio of the second pulse width modulation signal PWM2 becomes smaller than the duty ratio of the first pulse width modulation signal PWM1. However, in each frame, the total duty ratio of the first pulse width modulation signal PWM1 is the same as the total duty ratio of the second pulse width modulation signal PWM2.

In the first time period t1, the dimming signal generator 510 outputs the first and second pulse width modulation signals PWM1 and PWM2 at the high level. The first and second pulse width modulation signals PWM1 and PWM2 are logically ORed by the first logic circuit 521 and the result of the logical OR operation is applied to the second logic circuit 524. The pulse generator 523 outputs the driving pulse signal PWM in response to the compared result of the comparator 522. The second logic circuit 524 outputs the voltage control signal PWMS according to the driving pulse signal PWM in response to the output signal of the first logic circuit 521. In other words, the driving pulse signal PWM is applied to the voltage converter 540 during the high level period of the first or second pulse width modulation signal PWM1 or PWM2.

The voltage converter 540 generates the driving voltage Vout, to be applied to the light source 530, in response to the voltage control signal PWMS. The light source 530 applies first and second driving currents IL1 and IL2 at the high level corresponding to the driving voltage Vout, to the first and second driving blocks 531 and 532, respectively. As described above, the driving voltage gout and the current levels of the first and second driving currents IL1 and IL2 may be increased on the basis of the high level of the first or second pulse width modulation signal PWM1 or PWM2.

However, when the first and second pulse width modulation signals PWM1 and PWM2 are transited from the low level to the high level, the ripple may be generated in the driving voltage Vout and the first and second driving currents IL1 and IL2. As shown in FIG. 8, the ripple is generated in the driving voltage Vout and the first and second driving currents IL1 and IL2 at an early part of the first time period t1. In particular, as the low level period of the first and second pulse width modulation signals PWM1 and PWM2 becomes longer, the ripple generated in the driving voltage Vout and the first and second driving currents IL1 and IL2 are intensified.

The first driving block 531 emits the light corresponding to the first driving current IL1 in response to the high level of the first pulse width modulation signal PWM1. The second driving block 532 emits the light corresponding to the second driving current IL2 in response to the high level of the second pulse width modulation signal PWM2.

In the second time period t2, the dimming signal generator 510 outputs the first pulse width modulation signal PWM1 at the high level and the second pulse width modulation signal PWM2 at the low level. Accordingly, although the second pulse width modulation signal PWM2 is transited to the low level, the controller 520 may output the voltage control signal PWMS in accordance with the driving pulse signal PWM.

In more detail, the first logic circuit 521 is realized by the OR gate. Therefore, when any one of the first and second pulse width modulation signals PWM1 and PWM2 is at the high level, the pulse width modulation signal having the high level may be applied to the second logic circuit 524. Thus, the controller 520 may output the voltage control signal PWMS in accordance with the driving pulse signal PWM.

The first driving block 531 emits the light corresponding to the first driving current IL1 in response to the first pulse width modulation signal PWM1. When the second pulse width modulation signal PWM2 is transited to the low level, the second driving block 532 is not driven. Accordingly, the second driving current IL2 is reduced to a low level and the light is not emitted from the second driving block 532.

In the third time period t3, the dimming signal generator 510 outputs the first pulse width modulation signal PWM1 at the low level and the second pulse width modulation signal PWM2 at the high level. Although the first pulse width modulation signal PWM1 is transited to the low level, the controller 520 may emit the voltage control signal PWMS based on the driving pulse signal PWM. This is because the first logic circuit 521 applies the driving pulse signal PWM having the high level to the second logic circuit 524 in response to the second pulse width modulation signal PWM2 having the high level. Thus, the voltage converter 540 may output the voltage control signal PWMS on the basis of the driving pulse signal PWM.

In addition, when the first pulse width modulation signal PWM1 is transited to the low level, the first driving block 531 is not driven. Accordingly, the first driving current IL1 is reduced to the low level and the light is not emitted from the first driving block 531. However, since the second pulse width modulation signal PWM2 is transited to the high level, the second driving block 532 is driven. Therefore, the second driving current IL2 is increased to the high level and the light is emitted from the second driving block 532.

As described above, although the first pulse width modulation signal PWM1 is transited to the low level, the voltage converter 540 may be driven since the second pulse width modulation signal PWM2 is transited to the high level. In other words, during the high level period of the second pulse width modulation signal PWM2, the voltage control signal PWMS is applied to the voltage converter 540 on the basis of the driving pulse signal PWM. As a result, the level of the driving voltage Vout is not lowered.

In the fourth time period t4, the dimming signal generator 510 outputs the first and second pulse width modulation signals PWM1 and PWM2 at the low level. The controller 520 outputs the voltage control signal PWMS having the low level since the first and second pulse width nodulation signals PWM1 and PWM2 are transited to the low level. Therefore, the voltage converter 540 is not driven in response to the voltage control signal PWMS at the low level. As a result, the level of the driving voltage Vout is lowered and the driving voltage Vout is not applied to the light source 530.

In addition, since the first and second pulse width modulation signals PWM1 and PWM2 are transited to the low level, the first and second driving blocks 531 and 532 are not driven. Thus, the first and second driving currents IL1 and IL2 are decreased to the low level and the light is not emitted from the first and second driving blocks 531 and 532.

The backlight unit 500 performs the same operation during first to fourth time periods t1 to t4 of a second frame Frame2 as the first to fourth time periods t1 to t4 of the first frame Frame1. In addition, the ripple is generated in the driving voltage Vout and the first and second driving currents IL1 and IL2 at the early part of the second frame Frame2.

As described above, the backlight unit 500 according to the present exemplary embodiment driven on the basis of the first to fourth time periods t1 to t4 in each frame. In addition, the backlight unit 500 is driven by the dimming method according to the first and second pulse width modulation signals PWM1 and PWM2, and thus the period in which the driving voltage Vout falls may be shortened. Accordingly, the ripple generated at the early part of each frame may be reduced.

Figure 9:
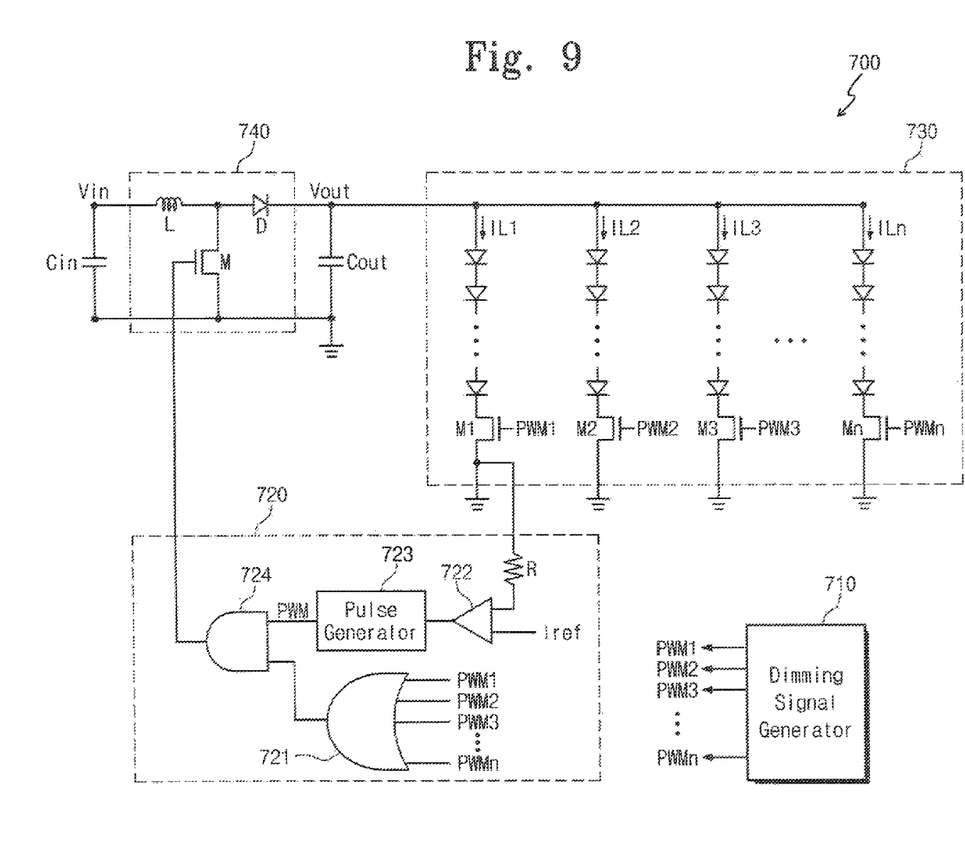
FIG. 9 is a circuit diagram showing a backlight unit according to an exemplary embodiment of the present invention.

FIG. 9 is a circuit diagram showing a backlight unit according to an exemplary embodiment of the present invention.

Referring to FIG. 9, a backlight unit 700 includes a dimming signal generator 710, a controller 720, a light source 730, and a voltage converter 740. The operation of the backlight unit 700 shown in FIG. 9 may be the same as the operation of the backlight unit 500 shown in FIG. 3. However, the backlight unit 700 includes the dimming signal generator 710 that generates pulse width modulation signals PWM1 to PWMn. In addition, the light source 730 includes driving blocks respectively corresponding to the pulse width modulation signals PWM1 to PWMn.

The voltage converter 700 may include the same components as the voltage converter 540 of FIG. 3. The controller 720 may include the same components as the controller 520 of FIG. 3. For example the controller 720 includes a resistor R, a comparator 722, a pulse generator 723, a first logic circuit 721 and a second logic circuit 722. However, the first logic circuit 721 receives the pulse width modulation signals PWM1 to PWMn as input.

The dimming signal generator 710 generates the pulse width modulation signals PWM1 to PWMn having different frequencies. For instance, when the first pulse width modulation signal PWM1 has the frequency of about 1 KHz, the n-th pulse width modulation signal PWMn has the frequency of "n". In other words, as the frequency becomes greater, the duty ratio of the pulse width modulation signal becomes smaller.

The driving blocks included in the light source 730 may be individually driven in response to the pulse width modulation signals PWM1 to PWMn applied to driving transistors M1 to Mn. For instance, the driving blocks may emit the light in response to the pulse width modulation signals having the high level. In other words, the driving blocks substantially simultaneously emit the light or individually emit the light corresponding to first to nth driving currents IL1 to ILn in response to the pulse width modulation signals PWM1 to PWMn.

As described above, the dimming signal generator 710 generates the pulse width modulation signals PWM1 to PWMn, and thus the period in which the voltage converter 720 is driven may be lengthened. As a result, the period in which the level of the driving voltage Vout falls may be shortened.

While the present invention has been shown and described with reference to exemplary embodiments thereof, it will be apparent to those of ordinary skill in the art that various changes in form and detail may be made thereto without departing from the scope and spirit of the invention as defined by the following claims.

What is claimed is:

1. A backlight unit, comprising:
   a dimming signal generator configured to generate first and second pulse width modulation signals;
   first and second driving blocks configured to receive a driving voltage to emit a light, wherein the first driving block is configured to receive the first pulse width modulation signal and the second driving block is configured to receive the second pulse width modulation signal;
   a controller configured to receive the first and second pulse width modulation signals and an output signal from only one of the first and second driving blocks to generate a voltage control signal; and
   a voltage converter configured to control a level of an input voltage in response to the voltage control signal to generate the driving voltage,
   wherein the first driving block comprises:
   a plurality of first light emitting diodes connected to each other in series to receive the driving voltage; and
   a first driving transistor connected between a ground terminal and the first light emitting diodes, the second driving block comprises:
   a plurality of second light emitting diodes connected to each other in series to receive the driving voltage; and
   a second driving transistor connected between the ground terminal and the second light emitting diodes, the first driving transistor is applied with the first pulse width modulation signal through a gate terminal thereof, and the second driving transistor is applied with the second pulse width modulation signal through a gate terminal thereof,
   wherein the gate terminal of the first driving transistor and the gate terminal of the second driving transistor are directly connected to the dimming signal generator,
   wherein the controller comprises:
   a first logic circuit configured to perform a logical OR-operation of the first and second pulse width modulation signals to output a logic value;
   a comparator configured to be connected with a first terminal of the first driving transistor and configured to compare the output signal from the only one of the first and second driving blocks with a reference signal;
   a pulse generator configured to generate a driving pulse signal in accordance with the compared result of the comparator; and
   a second logic circuit configured to perform a logical AND-operation on the logic value and the driving pulse signal to output the voltage control signal.

2. The backlight unit of claim 1, wherein the first and second pulse width modulation signals have different frequencies from each other.

3. The backlight unit of claim 1, wherein the voltage converter is a DC-DC converter.

4. The backlight unit of claim 1, wherein the first logic circuit comprises an OR gate.

5. The backlight unit of claim 1, wherein the second logic circuit comprises an AND gate.

6. The backlight unit of claim 1, wherein the second pulse width modulation signal has a frequency higher than a frequency of the first pulse width modulation signal.

7. The backlight unit of claim 6, wherein a total duty ratio of the first pulse width modulation signal is equal to a total duty ratio of the second pulse width modulation signal.

8. The backlight unit of claim 1, wherein an output signal output from the first driving transistor is applied to the controller.

9. A display device, comprising:
a display panel that includes a plurality of pixels configured to display an image; and
a backlight unit configured to supply a light to the display panel, the backlight unit comprising:
a dimming signal generator configured to generate first and second pulse width modulation signals;
first and second driving blocks configured to receive a driving voltage to emit a light, wherein the first driving block is configured to receive the first pulse width modulation signal and the second driving block is configured to receive the second pulse width modulation signal;
a controller configured to receive the first and second pulse width modulation signals and an output signal from only one of the first and second driving blocks to generate a voltage control signal; and
a voltage converter configured to control a level of an input voltage in response to the voltage control signal to generate the driving voltage,
wherein the first driving block comprises:
a plurality of first light emitting diodes connected to each other in series to receive the driving voltage; and
a first driving transistor connected between a ground terminal and the first light emitting diodes, the second driving block comprises:
a plurality of second light emitting diodes connected to each other in series to receive the driving voltage; and
a second driving transistor connected between the ground terminal and the second light emitting diodes, the first driving transistor is applied with the first pulse width modulation signal through a gate terminal thereof, the second driving transistor is applied with the second pulse width modulation signal through a gate terminal thereof and an output signal from the first driving transistor is applied to the controller,
wherein the gate terminal of the first driving transistor and the gate terminal of the second driving transistor are directly connected to the dimming signal generator,
wherein the controller comprises:
a first logic circuit configured to perform a logical OR-operation on the first and second pulse width modulation signals to output a logic value;
a comparator configured to be connected with a first terminal of the first driving transistor and configured to compare the output signal from the only one of the first and second driving blocks with a reference signal;
a pulse generator configured to generate a driving pulse signal according to the compared result from the comparator; and
a second logic circuit configured to perform a logical AND-operation on the logic value and the driving pulse signal to output the voltage control signal.

10. The display device of claim 9, wherein the first pulse width modulation signal has a frequency higher than a frequency of the second pulse width modulation signal, and a total duty ratio of the first pulse width modulation signal is equal to a total duty ratio of the second pulse width modulation signal.

11. A backlight unit, comprising:
a signal generator configured to generate first and second pulse width modulation signals;
a light source including a first driving block and a second driving block each receiving a driving voltage; and
a voltage converter configured to control a level of an input voltage in response to a voltage control signal to generate the driving voltage,
wherein a frame includes first, second, third and fourth consecutive periods,
wherein the first driving block is configured to emit light in the first and second consecutive periods in response to the first pulse width modulation signal and the second driving block is configured to emit light in the first period in response to the second pulse width modulation signal and not emit light in the second period in response to the second pulse width modulation signal,
wherein the first driving block is configured to receive the first pulse width modulation signal and the second driving block is configured to receive the second pulse width modulation signal,
wherein the first driving block comprises: a plurality of light emitting diodes connected to each other in series to receive the driving voltage; and a driving transistor connected between a ground terminal and the light emitting diodes, and the driving transistor is directly applied with the first pulse width modulation signal through a gate terminal thereof,
wherein the signal generator is configured to output the first pulse width modulation signal at the high level in the first and second consecutive periods and at the low level in the third and fourth consecutive periods, and output the second pulse width modulation signal at the high level in the first and third consecutive periods and at the low level in the second and fourth consecutive periods, and
wherein the voltage converter is configured to be turned on in the first to third consecutive periods and to be turned off in the fourth consecutive period.

12. The backlight unit of claim 11, further comprising a controller configured to receive the first and second pulse width modulation signals and an output of one of the first and second driving blocks to generate a voltage control signal.

13. The backlight unit of claim 12, further comprising a voltage converter configured to generate the driving voltage in response to the voltage control signal.

* * * * *